Dec. 22, 1964  N. J. FERRIS ETAL  3,162,168
SHIP WITH INCREASED CARGO CAPACITY
Filed June 22, 1962  7 Sheets-Sheet 1
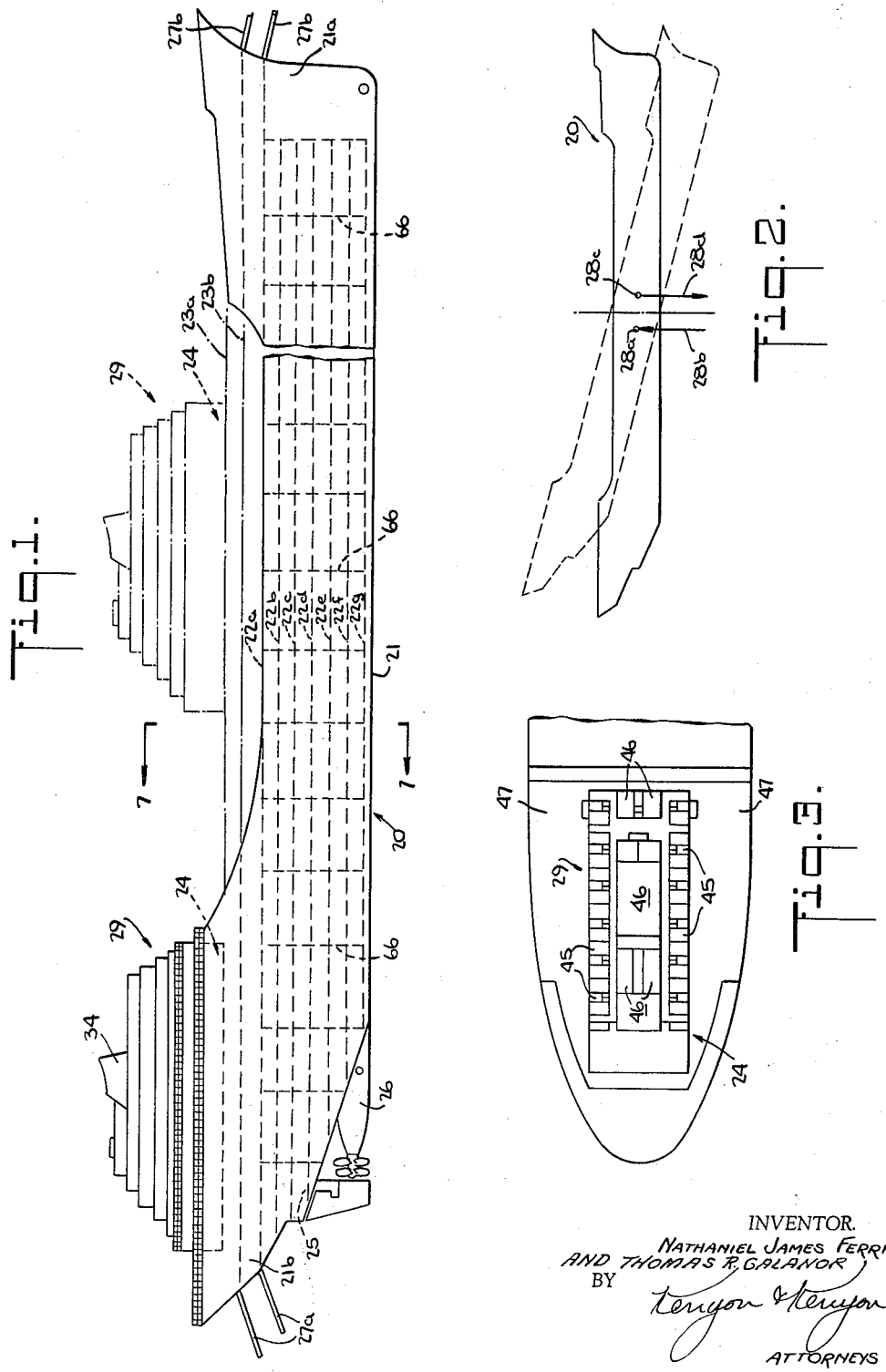
INVENTOR.
NATHANIEL JAMES FERRIS
AND THOMAS R. GALANOR
BY
ATTORNEYS

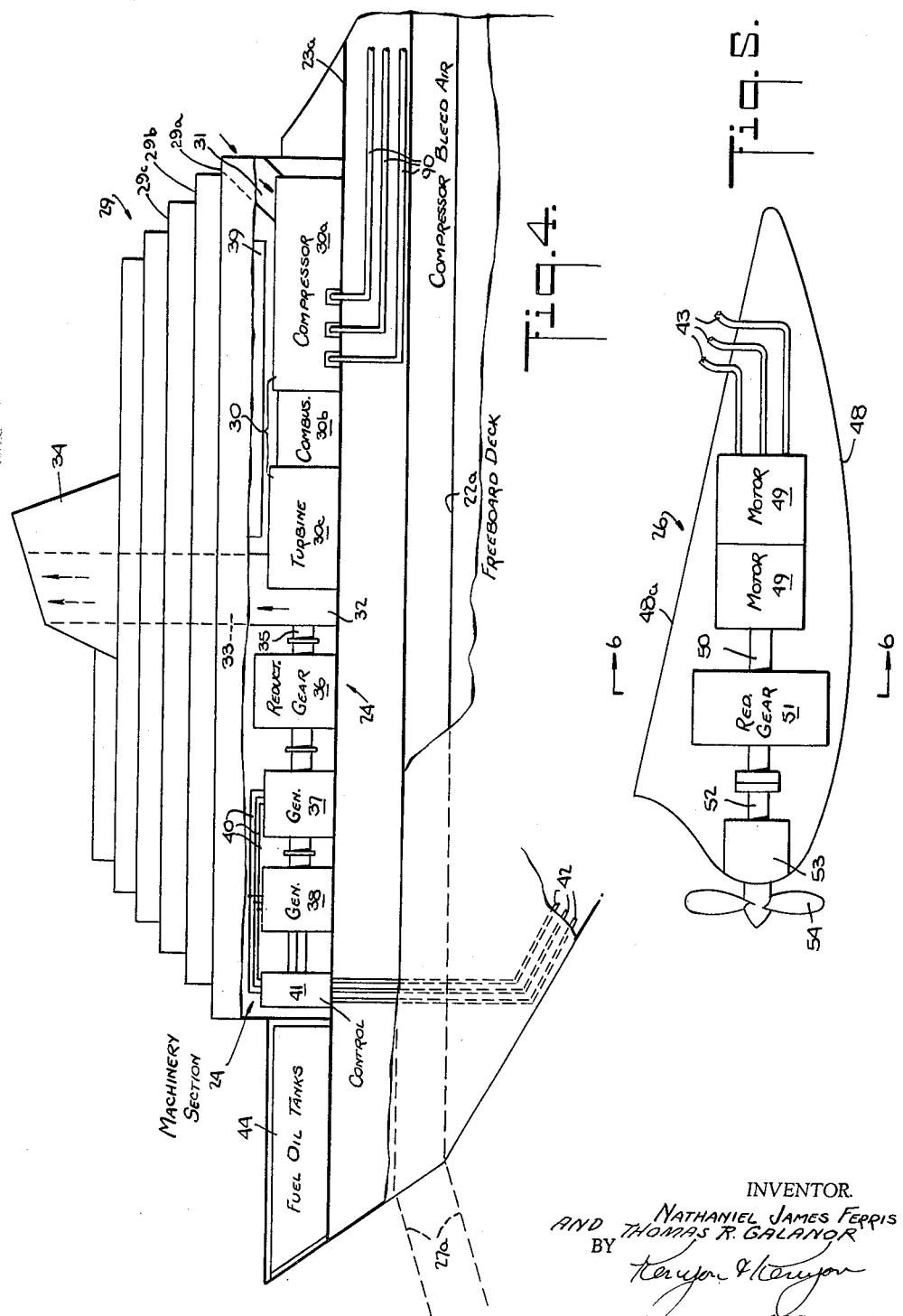

Dec. 22, 1964   N. J. FERRIS ETAL   3,162,168
SHIP WITH INCREASED CARGO CAPACITY
Filed June 22, 1962   7 Sheets-Sheet 3
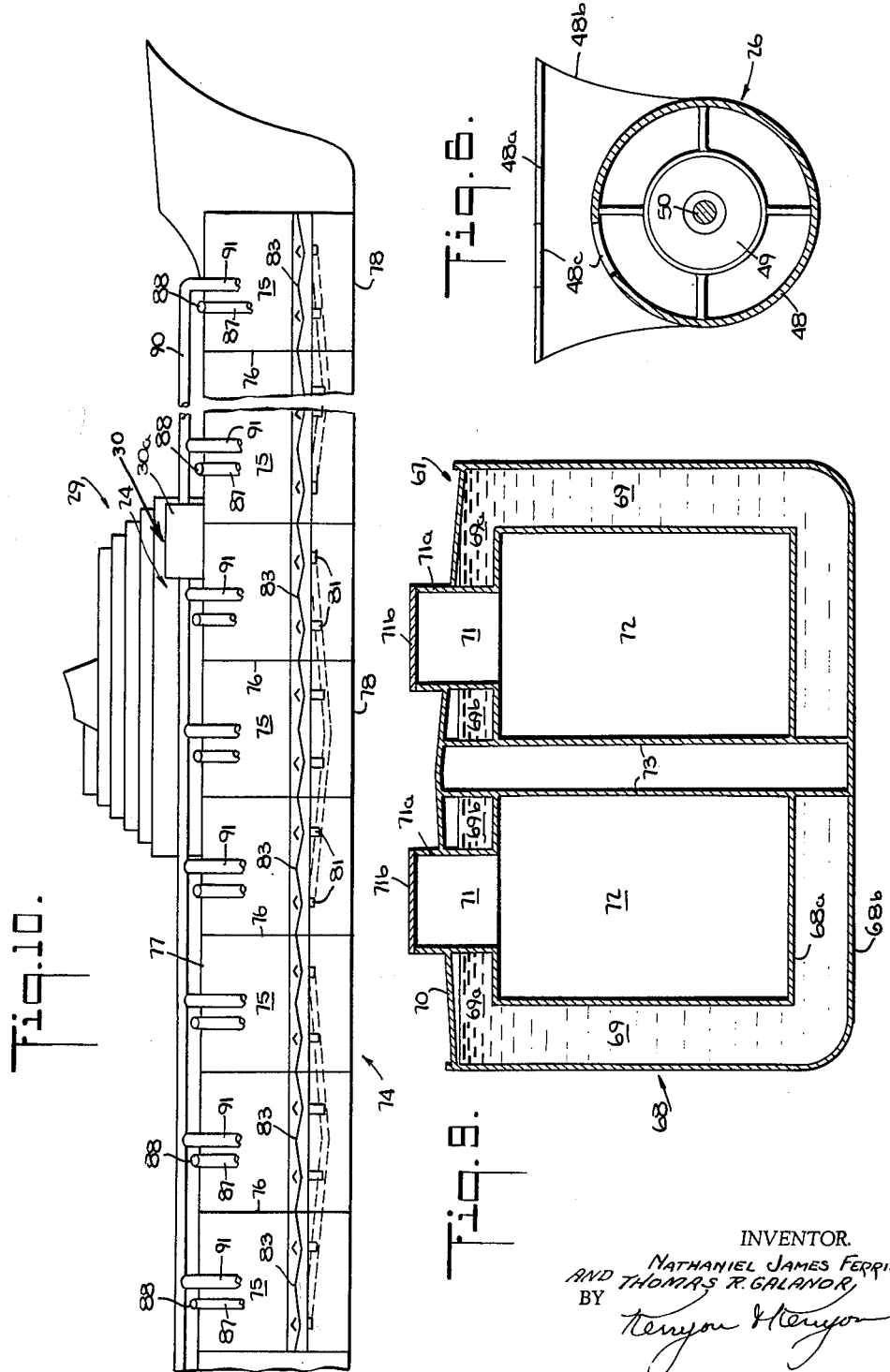
INVENTOR.
NATHANIEL JAMES FERRIS
AND THOMAS R. GALANOR,
BY
ATTORNEYS

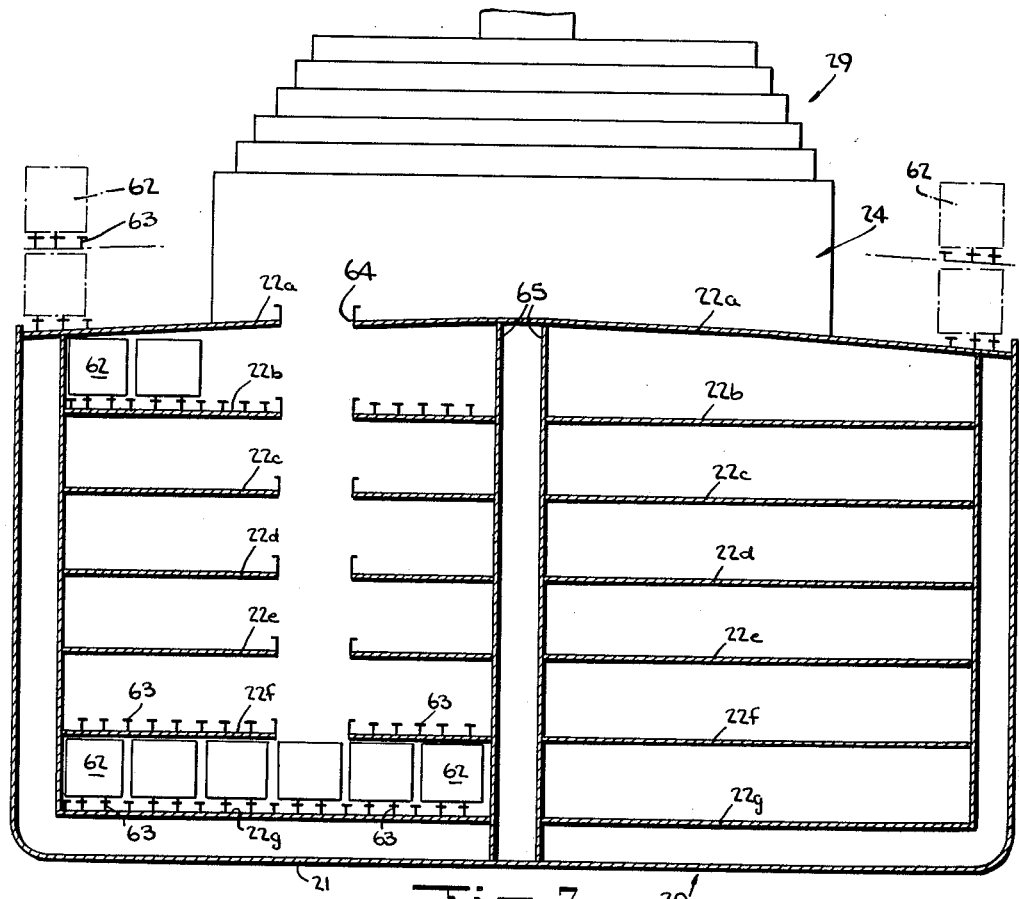
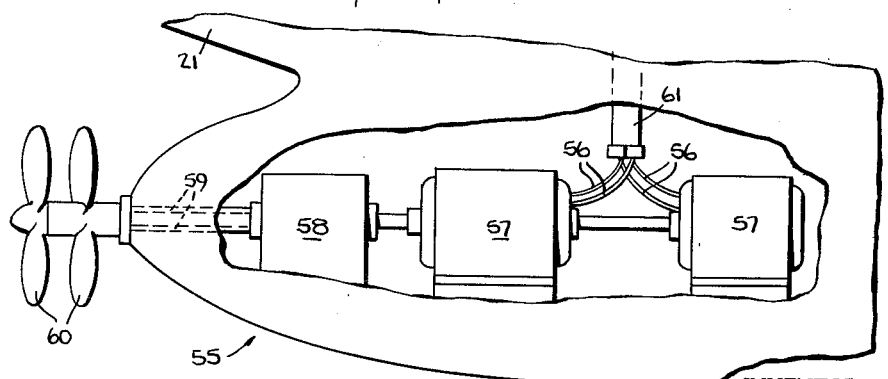

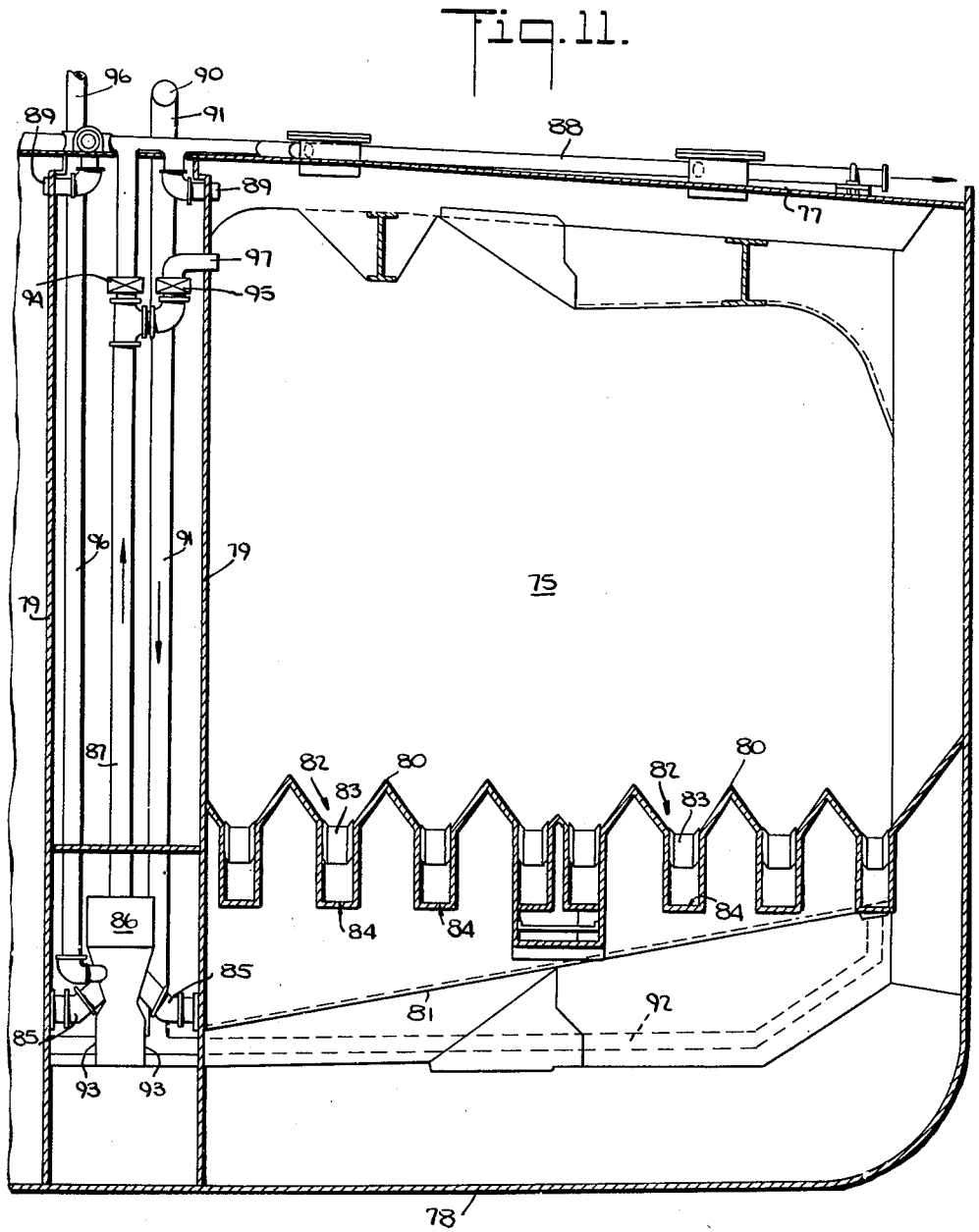

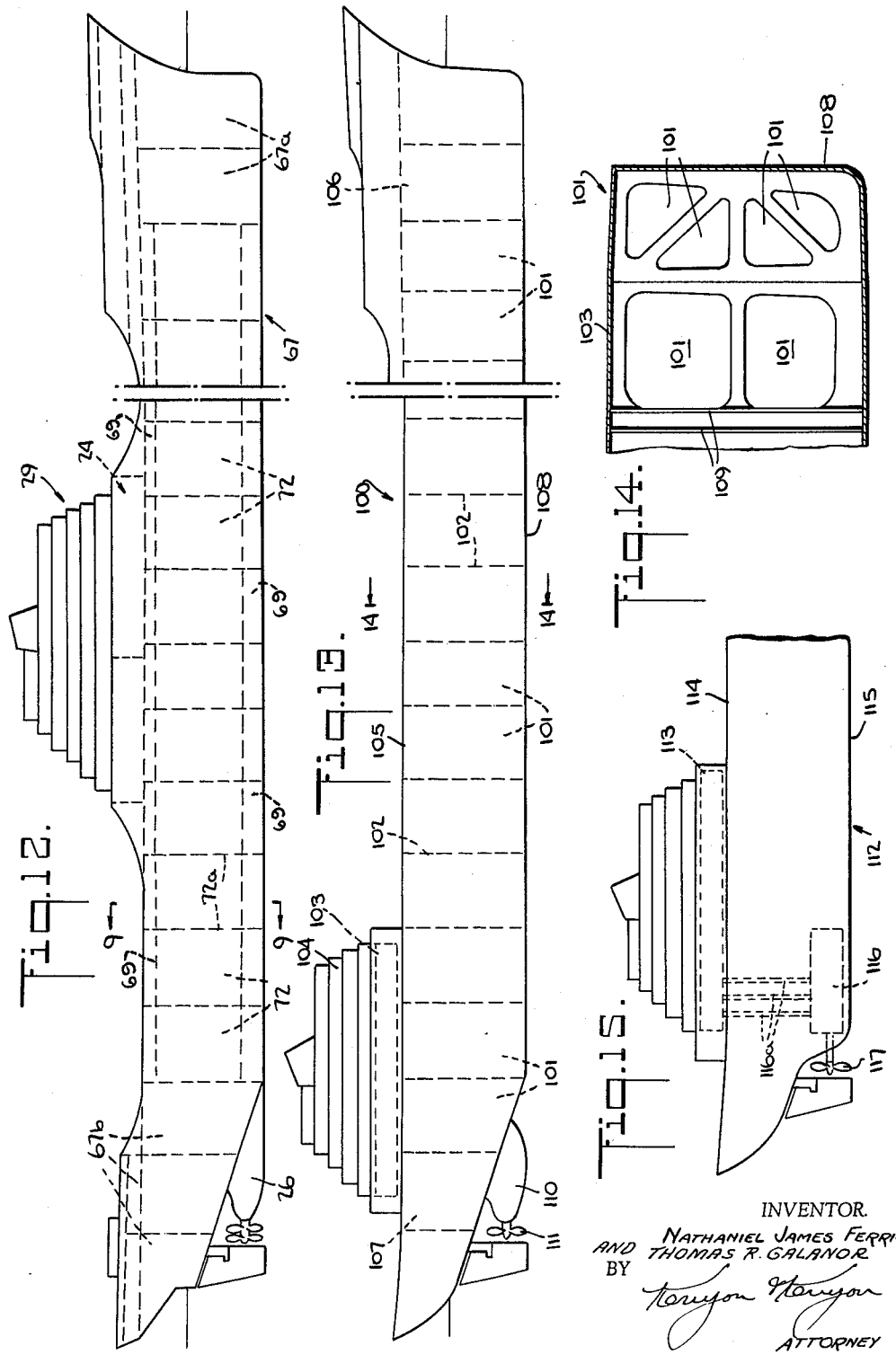

Dec. 22, 1964 N. J. FERRIS ETAL 3,162,168
SHIP WITH INCREASED CARGO CAPACITY
Filed June 22, 1962 7 Sheets-Sheet 7

INVENTOR.
NATHANIEL JAMES FERRIS
AND THOMAS R. GALANOR,
BY
ATTORNEYS

United States Patent Office 3,162,168
Patented Dec. 22, 1964

3,162,168
SHIP WITH INCREASED CARGO CAPACITY
Nathaniel James Ferris, Westchester County, and Thomas R. Galanor, Bronx, N.Y., assignors to Theodore E. Ferris & Sons, New York, N.Y., a partnership
Filed June 22, 1962, Ser. No. 204,314
8 Claims. (Cl. 114—72)

This invention relates to improvements in ships for providing an increase in cargo capacity and more specifically for enabling ships to handle cargoes of a wide range of densities in an efficient manner.

In order to obtain the maximum commercial utilization of a ship, it must have enough cargo space or "cargo cubic" to accommodate a weight of cargo sufficient to load the ship to the maximum draft permitted by the various governmental regulatory bodies. Of course when the ship is loaded with dense cargo the ship may be brought to the maximum permissible draft well before the point at which the cubic of the ship is completely occupied. However, there is a growing tendency for ships to carry cargoes of light density for which the ship may not have sufficient cubic to permit loading to the maximum weight condition. Packaged cargoes are typical of the relatively low density category. Such cargoes may be in the form of standard shipping containers, truck trailers, railroad freight cars, motor vehicles, and the like. Cargo of this type with its relatively low density requires an excessive amount of cubic and in many cases it is necessary for the ship to be operated at a condition greatly below its maximum weight capacity.

Attempts to meet this problem by increasing the overall cubic of the ship generally result in a ship having a weight carrying capacity greatly in excess of that which may be carried in the form of containers and the like. Consequently, in order to accommodate a greater weight of cargo, modifications have been made to provide for the stowage of cargo above the freeboard deck. Furthermore, additional exposed space has been provided by the installation of cargo carrying structure such as open framework, in tiers, if necessary, above the upper cargo enclosing deck, which in most ships is the freeboard deck. The provision of additional cargo carrying capacity in this manner is not a complete solution since it results in the cargo being exposed to the weather, may not provide sufficient cargo carrying ability to satisfy the deadweight tonnage capacity, and often complicates the handling of cargo.

Within the hull of a standard ship the propulsive and auxiliary machinery take up a great portion of the useable space and in many cases this equipment occupies between 20% and 25% of the ship's length within the hull. Obviously, this large fraction of the cubic of the ship is not available for the stowing of cargo. It is standard practice in the larger ships to allocate the aft end of the vessel to the machinery section while in smaller ships, the machinery may be disposed amidship.

Another factor in the design of ships which interferes with their economic and efficient utilization is that ships are in many cases tailor-made to suit a particular cargo. Because of this a ship designed for the carrying of liquid bulk cargo cannot carry another liquid cargo having a substantially different density nor can it carry dry cargo. The stowage factor or the number of cubic feet per ton for several dry bulk cargoes is: ore 12, cement 25, coal 38, bauxite 40, gypsum 41, and wheat 43–45. The typical stowage factors for liquids are: oil 39 and gasoline 45. The great range of stowage factors indicate that the ship must be adaptable for more than one cargo if it is to be utilized in an efficient manner when a cargo other than the design cargo is to be carried.

Another problem which interferes with the efficient utilization of the cargo capacity of the hold of a ship is that caused by the necessity of carrying conveying equipment for dry bulk cargoes. For example, in ships designed to carry cargoes such as grain, cement and the like, which can be conveyed from the ship to the dockside storage facilities by pneumatic equipment, it has been the practice to install machinery such as air compressors, piping, valves, etc., within what would otherwise be cargo hold space. The cubic occupied by such equipment is obviously not available to the dry bulk cargo. In addition, the locating of such equipment at a plurality of locations within the cargo hold complicates the maintenance and the operation of the equipment.

Attempts to overcome these problems on a piecemeal basis result in a complete lack of standardization between cargo vessels adapted to handle different cargoes. The result of this is an increase in the cost of design and construction of the various types of cargo ships, a decided degree of inflexibility in the operation of the ships, an increase in the rate of obsolescence, and the inability to convert older ships to a more universal and versatile design.

It is an object of this invention to increase the area of deck space available to cargo within the hull of a ship.

It is another object of this invention to make the various decks in the hull of the ship available to cargo from substantially the bow to the stern portions.

It is still another object of this invention to increase the volume of space available to cargo within the hull of the ship.

It is an additional object of the invention to make available to cargo the portion of a ship within the hull which is normally occupied by the prime mover, the propulsion equipment, and auxiliary machinery.

It is an additional object of the invention to provide a hull having a stern portion which prevents an adverse flow of water in the vicinity of the propeller.

It is a further object of the invention to provide a ship capable of carrying a greater weight of cargoes having a large range of stowage factors.

Still a further object of the invention is to reduce and to consolidate the space within the cargo hold of the ship necessary for machinery related to the handling of dry bulk cargoes.

In one embodiment of the invention, the prime mover serving as the source of propulsion energy is disposed above the uppermost cargo enclosing deck of the hull which in most ships is the freeboard deck. Where the term "freeboard deck" is hereinafter used, it shall be understood to have this meaning. The energy from the prime mover is transmitted to a propulsion motor which in turn actuates the means for propelling the ship.

In another embodiment of the invention the prime mover and the means for generating the electrical propulsive power which is driven by the prime mover are located above the freeboard deck of the hull. A propulsion motor energized by the generating means actuates the means for propelling the ship.

In still another embodiment of the invention, the prime mover which is located above the freeboard deck of the hull comprises a gas turbine engine.

In an additional embodiment of the invention, the prime mover is in the form of a unit which is adapted for installation adjacent one of a plurality of locations along the fore and aft axis of the hull above the freeboard deck.

In another embodiment of the invention, the propulsion equipment is in the form of a unit comprising the means for actuating the propelling means of the ship, which unit is adapted to be attached to the exterior portion of the ship's hull.

In still another additional embodiment of the invention the ship is provided with a prime mover unit located above the freeboard deck of the hull and a propulsion unit adjacent the exterior portion of the hull thereby making substantially the entire length of the interior of the hull from the bow to the stern portion of the ship available for cargo.

In another additional embodiment of the invention the hull is provided with a scow-type stern section to prevent the inducement by the hull of adverse flow conditions in the vicinity of the propeller.

In a further embodiment of the invention the cargo space within the hull including that made available by the prime mover unit and propulsion unit arrangement is adapted for the carrying of liquid cargo adjacent the outer portions of the hull and dry cargo adjacent the inner portion of the hull.

In another further embodiment of the invention the interior of the hull including that portion made available by the prime mover unit and propulsion unit arrangement is provided with a double bulkhead extending longitudinally within the hull to accommodate machinery and equipment including that related to the handling of the cargo.

In still another further embodiment of the invention there is provided a ship adapted for dry bulk cargo which includes the prime mover unit and propulsion unit arrangement. The prime mover unit employs a gas turbine engine which can serve as the supply of compressed air required for pneumatic cargo conveying equipment.

Various other objects and advantages of the present invention will be readily apparent from the following detailed description when considered in connection with the accompanying drawings in which:

FIG. 1 is a side elevational view of the ship of the invention showing the prime mover unit located at various possible locations along the fore and aft axis of the hull above the freeboard deck and the propulsion unit located adjacent the exterior of the hull;

FIG. 2 is a schematic representation of the change in the longitudinal center of gravity of the ship which can be effected by the location of the prime mover unit along the fore and aft axis of the hull;

FIG. 3 is a fragmentary plan view of the ship of the invention showing the prime mover unit and the superstructure disposed in an overlying position with respect to it;

FIG. 4 is a fragmentary elevational view of the prime mover unit disposed above the freeboard deck of the hull adjacent the stern portion of the ship;

FIG. 5 shows the propulsion unit which is adapted to be attached to the exterior surface of the hull;

FIG. 6 is a vertical section view of the propulsion unit taken along line 6—6 in FIG. 5;

FIG. 7 is a vertical section view taken along the line 7—7 in FIG. 1 and showing the cargo hold of the ship adapted to carry containers;

FIG. 8 shows the propulsion unit containing a contrarotating drive attached to the exterior surface of the hull of the ship;

FIG. 9 is a vertical section taken along line 9—9 in FIG. 12 showing a ship for carrying liquid cargo adjacent the outer portion of the hull and dry cargo adjacent the inner portion of the hull;

FIG. 10 is a fragmentary elevational view of a ship for carrying dry bulk cargo in which pneumatic conveying equipment receives a supply of compressed air from the gas turbine engine in the prime mover unit;

FIG. 11 is a fragmentary vertical section of a ship for carrying dry bulk cargo in which the pneumatic conveying equipment is disposed in a longitudinal double bulkhead and in which the pneumatic equipment is supplied by compressed air from the gas turbine engine in the prime mover;

FIG. 12 is a side elevational view of a ship for carrying liquid adjacent the outer portion of the hull, dry cargo adjacent the inner portion, and liquid cargo at the bow and stern portions;

FIG. 13 is a side elevational view of a tanker ship having the prime mover unit located above the freeboard deck and the propulsion unit located adjacent the exterior of the hull;

FIG. 14 is a vertical section view taken along line 14—14 in FIG. 13 showing the interior of the hull of the tanker ship;

FIG. 15 is a partial elevational section view of a ship having a prime mover unit above the freeboard deck and a propulsion unit within the hull.

Figure 16:
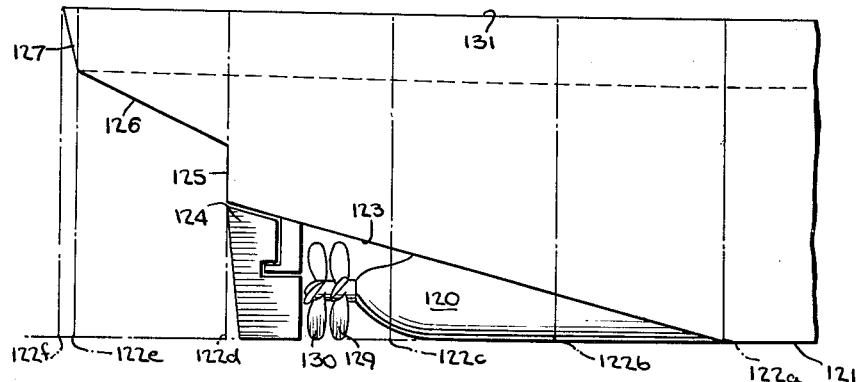
FIG. 16 is a fragmentary elevational view of the stern portion of a ship having a scow-type stern construction with a propulsion unit attached thereto.
Figure 18:
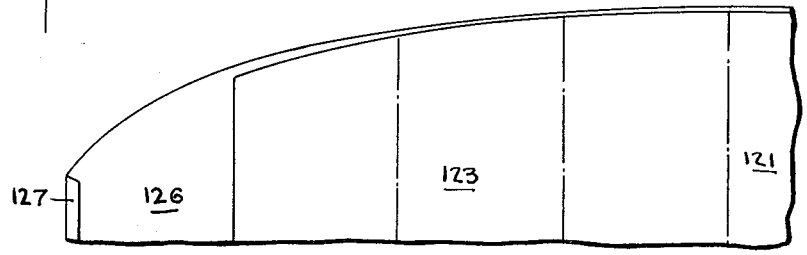
FIG. 18 is a fragmentary view of the bottom of the stern portion of the ship, further showing the scow-type stern construction.

In FIG. 1 container ship 20 includes hull 21 having bow portion 21a and stern portion 21b. The hull contains a plurality of decks 22a–g which include freeboard deck 22a and bottom deck 22g. Above freeboard deck 22a are cargo carrying structures, such as open framework in tiers 23a and b which enable additional cargo to be loaded on such structures. Prime mover unit or machinery section 24 is disposed at least above freeboard deck 22a of the hull. Machinery section 24 serves as the source of power for propulsion unit or appendage 26 attached to the exterior surface of hull 21. The source of power can be a steam engine or turbine, an internal combustion engine, a gas turbine, a steam or gas generator, a nuclear reactor, or the like.

The propulsion unit contains a motor device which is driven by the energy from the source in the machinery section. The motor can include those energized by electric current and those energized by pressured fluids such as steam, gas and hydraulic.

The locations of the machinery section and the appendage as shown in FIG. 1 free the interior of hull 21 of the cubic requirement for this equipment and thereby enable decks 22a–g to extend substantially for the entire length of the ship from bow portion 21a to stern portion 21b. With this arrangement rolling cargo such as trucks and truck trailers as well as vehicles employed in moving cargo containers can have access to the ship by one or more stern ramps 27a and bow ramps 27b. Dockside cargo handling equipment can be used to place vehicles, containers, and other cargo directly onto the weather decks and into hatches leading to decks 22b–g.

FIG. 2 is a schematic representation of the buoyant and gravity forces acting upon ship 20. The longitudinal center of the buoyancy 28a which is the longitudinal center of gravity of the body of water displaced by the ship is the point of action of the buoyant force represented by vector 28b. Thus vector 28b represents a summation of all the vertical forces operating in an upward direction upon the ship. Vector 28d represents the weight force of the ship acting downwardly from its center of gravity 28c. As is well known the trim of the vessel in a fore and aft direction is a function of the relative location of the two centers about which vectors 28b and 28d act.

In a conventional ship the placement of the machinery section adjacent the stern portion and in the portions of the hull beneath the waterline as well as the standard locations for the superstructure serve to restrict the location of the center of gravity along the longitudinal axis of the hull. The result is that the designer is confined in selecting the hull form since the hull must be conditioned in such a manner that the longitudinal center of buoyancy is at a location to provide the proper trim function. In the ship of the invention the longitudinal center of gravity unlike in the prior art case is not confined by the location of the machinery section or that of the superstructure. As shown in FIG. 1 machinery section 24 and superstructure 29 overlying it can be placed as a unit at various locations along the hull. Thus the machinery section and superstructure may be disposed adjacent to the stern if the preferred form of the hull leads to a location of the longitudinal center of buoyancy which is compatible to this.

On the other hand the machinery section can be moved near to an amidship location. It is not necessary that the machinery section be located adjacent the superstructure. In some arrangements it may be desirable to position the superstructure appreciably toward the bow. In any event due to the package or unit construction of the machinery section and also the superstructure, the designer is free to position these assemblies along the longitudinal axis of the hull in order to position the longitudinal center of gravity at the optimum position for a given hull construction and its attendant longitudinal center of buoyancy location. Thus the hull can be designed to provide the optimum requirements for resistance to sea motion and for stability and then subsequently the package or unit of the machinery section and superstructure can be positioned along the hull in order to obtain a compatible location of the longitudinal center of gravity thereby providing the proper trim. Positioning of the machinery section as well as the superstructure having living quarters, operational stations, etc., also allows for posturing the load on the ship so as to obtain the optimum bending moment, and thereby effecting the least stress and strain on the ship considered as a girder.

In constructing a new ship or in modifying an existing one, the structure including the prime mover unit or machinery section 24 can be fabricated separately from the hull of the ship. Similarly the superstructure can be constructed with the prime mover unit independently of the hull. Regardless of whether the hull is to be adapted for the carrying of containers, vehicles, bulk dry cargo, liquid cargo or mixed bulk and dry cargo, the package including the machinery section and superstructure can be installed upon the hull to provide the proper trim function. The package arrangement has the further advantage of enabling a degree of standardization to be provided in ship construction since a package of a given design may be used with a variety of hull types.

In FIG. 4 machinery section 24 contains a prime mover such as gas turbine engine 30 including air compressor 30a, combustion section 30b and turbine 30c. Air inlet 31 provides the passage for the flow of air entering into the engine compressor. Exhaust gas flowing from turbine 30c passes through exhaust section 32 which leads to an exhaust outlet 33 in stack 34. Turbine output shaft 35 may be coupled to reduction gear 36 in order to reduce the high rotational speed of the turbine to a speed that is suited to drive electrical generators 37 and 38 which are coupled to the reduction gear. Feeder cables 40 lead from the generators to control equipment 41 which regulates the flow of electrical power to feeder cables 42 connected to propulsion motor cables 43 (FIG. 5).

Auxiliary machinery 39 such as pumps, standby power supplies, etc. is also installed in machinery section 24. With this arrangement the decks within the hull are free of the bulk of the machinery section and the only equipment passing through the hull and decks is that of feeder cables 42. Fuel for the gas turbine engine can be stored in a plurality of tanks 44 adjacent the machinery section and in other portions of the ship without the cargo hold such as in the double bottom.

Superstructure 29 can overlie machinery section 24 whenever it is installed adjacent to it (FIG. 3). The superstructure contains decks 29a, b, c, etc., upon which are located staterooms 45 as well as miscellaneous rooms and compartments 46 used for the various operating facilities of the ship. Deck space 47 can be used to provide access to stern portion 21b in order that vehicles may be routed to stern ramps 27a. As determined by the space needed to house the prime mover and auxiliary machinery, machinery section 24 can extend entirely across the hull. In such an arrangement tunnel passages can be extended through it to provide access to the stern portion of the ship. Similarly the superstructure may be extended to the side portions of the ship.

Propulsion unit or appendage 26 (FIG. 5) includes housing 48 in which are mounted propulsion motors 49 connected by drive shaft 50 to reduction gear 51. Propeller shaft 52 extends from the reduction gear through the shaft bearing 53 to propeller 54. Electrical power from the prime mover unit is delivered to the motors by means of feeder cables 43. The appendage which can be fabricated as a single unit or package separate from the hull is adapted for attachment to its exterior surface. Where the propulsion motor or motors can operate at propeller shaft speed, the reduction gear is dispensed with and direct drive is employed.

With the package or unit arrangement the appendage is connected along surface 48a which is adapted to fit the hull (FIG. 6). The appendage is streamlined with a substantially circular cross section and with fairings 48b between the major body of the appendage and surface 48a in order to provide an appendage which will give a proper flow of water to the propeller and thus gain propulsive efficiency, which can equal or surpass that of conventional ships. Hatches 48c provide access to the motors, shaft and bearing. By virtue of the package construction technique one or more appendages of a common design can be employed with a variety of ship designs. Examination of FIG. 5 demonstrates that all of the propulsion equipment is removed from the interior of the hull by virtue of the appendage construction so that decks within the hull such as 22d–22g can be extended to the stern portion of the vessel which in a conventional ship would be occupied by the machinery section.

Figure 17:
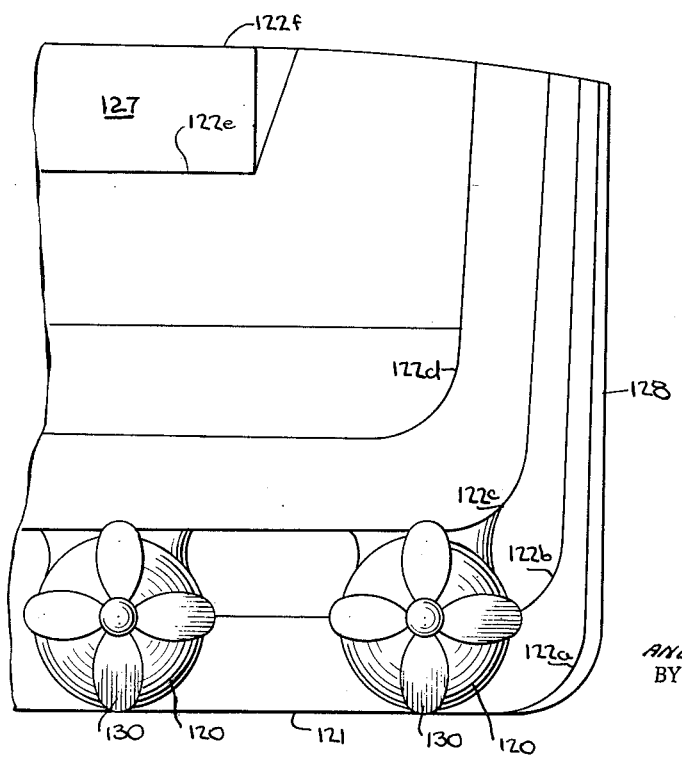
FIG. 17 is a fragmentary elevational view looking toward the stern of the ship and showing the scow-type stern construction and the locations of the propulsion units.

As shown in FIG. 16, appendage or propulsion unit 120 is preferably employed with a ship having a stern portion of a scow-type construction. The scow-type construction is shown in FIGS. 16 and 17 by a plurality of athwartship stations. In the scow-type construction, bottom 121 of the ship extends rearwardly in a substantially flat manner to station 122a adjacent the stern portion. The sides of the ship forward of station 122a are substantially flat and parallel and disposed in a vertical direction as shown in FIG. 17. Aft of station 122a, sloping flat bottom 123 extends through stations 122b and 122c to station 122d which is adjacent to the upper portion of rudder 124. Station 122d is substantially adjacent the waterline and from here the hull extends upwardly into flat vertical section 125. The remainder of the stern portion includes upper flat sloping surface 126 which extends to station 122e. Flat transom 127 extends in an upward manner to station 122f.

The athwartship dimension of the ship converges only a slight amount up to station 122a (FIG. 17). However, aft of station 122a the hull converges in width through stations 122b–f. Since sides 128 of the hull and the bottom 121 are substantial planes disposed at right angles to one another there is little tendency for the hull to induce a flow of water downwardly and in a rearward direction as the ship proceeds through the water. Ships having outwardly sloping sides and a rounded bottom cause an appreciable flow of water in a downward and rearward direction with respect to the hull. The extending of sloping bottom 123 from flat bottom 121 which causes an abrupt transition in the hull in conjunction with the flat vertical sides minimizes the inducement of flow inwardly toward the bottom and rearwardly along the sides and bottom. In a conventional hull which curves inwardly and coverges toward the stern, there is a strong tendency for water flow to be induced inwardly and toward the stern which results in an increase of circulation of water in the vicinity of the propellers. Since a good portion of this flow originates along the surface, large quantities of air are entrained in the water. The presence of large quantities of air in the water passing adjacent to the propeller promotes cavitation, especially when it is highly loaded.

With the scow-type construction including sloping flat bottom 123 and substantially flat vertical sides 128, the flow of water downwardly and inwardly toward the stern is substantially eliminated. In this way the quantity of water with entrained air flowing in the vicinity of the propellers is greatly reduced. With the scow-type construction one or more appendages 120 can be positioned along sloping flat bottom 123 and still be in a region which is substantially free of water containing entrained air. Appendages or propulsion units 120 contain motors energized by a prime mover unit substantially above freeboard deck 131 of the vessel. The motors within the appendage can drive standard propellers or contra-rotating propellers 129 and 130. In this way the propellers are enabled to operate in a region which is substantially free from water containing entrained air with the result that the propellers can operate in an efficient manner without cavitation even when transmitting high horsepower.

Beyond improving the efficiency of the propulsion system, the scow-type construction offers the additional advantage of making a greater portion of cubic within the hull available to cargo. Thus the substantially rectangular across section of the hull is maintained throughout its length and only beyond station 122a is the depth of the hull varied. Furthermore, with the scow-type construction, sloping bottom 123 provides a plane surface upon which one or more of appendages 120 can be conveniently mounted. The angle of the sloping bottom 123 with respect to bottom 121 can be maintained substantially constant regardless of the type of cargo the ship is conditioned to carry. With the constant angle relationship, the appendage can be conveniently fabricated in a package form and yet fit a variety of hulls which are adapted for different cargoes.

The scow-type hull when used with the conventional arrangement of prime mover and propulsion drive within the hull can result in the machinery being moved excessively far forward in the ship due to the sloping flat bottom construction. Thus the benefit with the scow-type stern of improved water flow conditions adjacent to the propeller are denied to a ship having the machinery in the hull. On the other hand the locating of the prime mover above the freeboard deck alone makes the scow-type stern more practical since additional cubic is made available to cargo. Of course the maximum amount of cubic is made available to cargo when both the prime mover above the freeboard deck and the appendage arrangements are used. FIGS. 1, 12 and 13 show the application of the scow-type stern to vessels adapted to carry various different cargoes.

Instead of the package construction of the appendage, appendage 55 can be built as an integral part of hull 21 (FIG. 8). Feeder cables 56 from the prime mover unit are connected to propulsion motors 57 which in turn together drive reduction gear 58. Whether the propulsion unit is built as a package or as an integral part of the hull structure, contra-rotating propellers can be employed for reasons of economy of structure and increased efficiency. In such an arrangement, the output of the reduction gear is transmitted through coaxial shafts 59 which are connected to contra-rotating propellers 60. Conduit 61 encases feeder cables 56 for their passage through the cargo hold.

FIG. 7 shows a transverse section of the container ship version of the invention. The location of machinery section 24 makes available decks 22b–g for containers 62. The decks are covered with a plurality of conveyor rollers in order that the containers or trailers may be moved with the least amount of effort about the decks into their proper stowing position. The decks can be provided with conveying equipment to facilitate the movement of trailers, containers, and the like from the area adjacent the hatch to the area in which the cargo is to be stowed for the voyage. As shown in FIG. 7, beam members of the deck structure can be adapted to serve as means for moving the cargo within the ship. In conventional ships, the plates of each deck are supported by horizontal beams from beneath. In accordance with an embodiment of the invention, beams 63 are disposed horizontally above the plate members of the deck. The upper surface of the beams are provided with means for conveying cargo such as trailers, containers, and the like. The conveying means includes tracks or rails in the upper surface of the beams. The tracks or rails receive rollers or wheels on the containers for moving the cargo. This arrangement not only facilitates movement of the cargo but it has the advantage of effecting a saving in space since each deck has a vertical dimension equal only to the sum of the height of beam 63 plus the thickness of the deck plate. In a conventional ship, the vertical dimension would be the sum of the height of the beam, the thickness of the deck plate, and the height of the tracks or rails for moving the cargo. With the cumulative saving of space in the vertical direction, it then becomes possible to install an extra deck in the same vertical dimension of the conventional hull.

Hatch 64 provides access to decks 22b–g. Double bulkhead 65 extends along the longitudinal axis of the ship from the bottom of the hull to substantially the freeboard deck. In a ship having the prime mover unit above the freeboard deck and separated from the remote propulsion unit located at the scow shaped stern, the double bulkhead construction provides the space for the routing of the feeder cables between the units as well as space for cargo handling machinery. By concentrating this equipment along the centerline, the double bulkhead makes it possible to provide decks extending from the bow section to the stern section substantially without interruption except for transverse bulkheads 66 which are required in order to maintain watertight compartmentation. Thus throughout the ship, machinery, piping, cables, and the like can be concentrated in the area of the double bulkhead thereby removing these items from the area for cargo stowage. The double bulkhead can also serve as a passageway throughout the cargo hold of the ship. The freeboard deck is unobstructed so that cargo can move from stem to stern.

Ship 67 in FIG. 9 and FIG. 12 is designed to carry both liquid and dry cargo in order that the ship may be loaded in a more efficient manner. The use of the arrangement including the propulsion unit and the prime mover unit makes available practically the entire interior portion of the hull for dry and liquid bulk cargo. By virtue of double skins 68a and b of hull 68, tank section 69 is formed therebetween. Tank 69 can be extended into portions 69a and b underlying freeboard deck 70.

Hatches 71 extend through the tank portions and communicate with dry cargo holds 72. The provision of hatch coamings 71a and hatch covers 71b safeguard holds 72 from the entry of water from above. Double bulkhead 73 can be employed to separate the holds and to provide space to receive auxiliary machinery, cables between the prime mover and propulsion units, etc., in this type of ship.

With the bulk liquid and dry cargo arrangement shown in FIG. 9 it can be seen that the amount of cargo in the tank section and in the dry cargo hold section can be adjusted in order to load the ship in the most efficient manner. In addition this construction makes the ship available to carry a single type of cargo or a combination of dry and liquid cargoes. Thus the ship is not restricted to one type of cargo and consequently can be operated in a more flexible and efficient manner. Again the prime mover unit and propulsion unit construction in conjunction with the double bulkhead arrangement makes available the maximum amount of the interior of the hull to receive the liquid and dry bulk cargoes. Furthermore, the ability to position the prime mover unit as well as the superstructure overlying it along the longitudinal axis of the ship enables the designer to have complete freedom with respect to the hull construction so that the most efficient ratio of liquids to dry bulk cargo may be obtained. The prime mover unit and related superstructure can then be positioned in order to locate the longitudinal center of gravity to provide the necessary trim function and preferred bending moment conditions.

As shown in FIG. 12, transverse bulkheads 72a divide the hull into a plurality of holds 72 which are enclosed by tank 69. The holds and tank can be disposed along substantially the entire length of the hull. On the other hand, as also shown in FIG. 12, bow section 67a and stern section 67b can be provided with compartments extending across the hull and adapted to carry liquid cargo only.

The embodiment of the invention in FIG. 10 is a bulk cargo carrier such as one for carrying cement. Cement carrier ship 74 comprises a plurality of compartments 75 disposed along the length of the ship. The compartments are formed by transverse bulkheads 76. Machinery section 24 and the superstructure 29 overlying it is positioned above the freeboard deck as well as above weather deck 77. Machinery section 24 can include a gas turbine engine for the prime mover. Gas turbine engine 30 comprises compressor 30a which provides the air flow of the turbine of the gas turbine engine and at the same time has sufficient capacity to supply compressed air for other uses aboard the ship. Cement carrier 74 includes hull 78 which contains double bulkhead 79 extending along its length in the fore and aft direction (FIG. 11). Within each of the compartments disposed between double bulkhead 79 and hull 78, the cement is stowed upon horizontal longitudinal hogbacks 80 which in combination with troughs 84 form a horizontal deck (FIG. 11). The hogbacks are provided with inclined air slide conveyors 82 including inclined porous surfaces 83 of canvas or other permeable material mounted over horizontal troughs 84. The surfaces 83 of the conveyors 82 slope toward transverse conveyors 81 (FIG. 10). Transverse conveyors 81 can be of a similar construction. The application of a predetermined level of pressured air to the troughs beneath the sloped or inclined porous surfaces causes the fine granular cement material to flow downwardly along surfaces 83 towards transverse conveyor 81. The cement after passing downwardly along conveyor 81 toward the double bulkhead moves through pipe 85 into pneumatic pumping device 86.

Pumping device 86 discharges the cement through pipe 87 which connects to discharge manifold 88. Dust particles can pass from the compartments through pipes 89 which are connected to the discharge manifold. Compressed air for the pneumatic pumping device as well as that required for the air slides is delivered by air main 90 through risers 91. Pipe 92 connected to riser 91 supplies air to the air slides while connection 93 supplies air to the pumping device. When discharging the cargo, valve 94 in pipe 87 is in the open position while valve 95 leading to pipe 97 is closed. When loading the cement cargo, the cement material is introduced into pipe 96 in order that it may pass by gravity into pneumatic pumping device 86. In this condition of operation valve 94 is closed and valve 95 is open in order that the cement can flow upwardly through pipe 87 and pipe 97 into the compartment.

As shown in FIG. 10, air main 90 is connected to compressor 30a in order that bleed air from the compressor can serve as the air supply for the pneumatic pumping devices and the air slides. In this way the air compressor of the gas turbine engine is adapted to serve both as the source of compressed air for the engine and also as the source of compressed air for the ship's cargo handling system requirements, such as the pumping devices and the air slides. Consequently the cubic normally occupied by air compressors is made available for cargo. It can be further seen that the double bulkhead construction in the cement carrier ship also provides a suitable space for the feeder cables extending from the prime mover to the propulsion unit, the pneumatic pumping devices, and the plurality of pipes and valves related to the equipment for handling the dry bulk cargo, and all ship's services.

The embodiment of the invention in FIG. 13 comprises bulk liquid carrier or tanker 100 such as one for carrying refined or unrefined liquid fuels. Tank compartments 101 are formed by transverse bulkheads 102. Machinery section 103 and superstructure 104 overlying it is positioned above the freeboard deck 105. Machinery section 104 can include a prime mover such as a gas turbine engine. The compressor of the gas turbine engine which provides the air flow to the turbine section is available to be bled in order to also serve as a source of compressed air for other uses aboard the ship such as providing the energy to operate air-driven pumps in pump compartments 106 and 107 for puping the liquid out of the ship. The gas turbine drives one or more generators which provide the propulsion energy as well as energy for auxiliary equipment throughout the ship. Hull 108 of the tanker can be provided with double bulkhead 109 extending along its length in the fore and aft direction (FIG. 14). Within each of the compartments 101 disposed between double bulkhead 109 and hull 108, the liquid cargo is stowed. Pumping devices and other equipment are disposed in the double bulkhead and with such an arrangement, compartments 106 and 107 can be employed as additional tank space.

Tanker 100 is propelled by means of appendage or propulsion unit 110 which extends from the exterior of hull 108 and contains a motor device for operating propeller 111. The output of the source of energy in machinery section 103 is transmitted to the appendage. With this arrangement of the machinery section above the freeboard deck and the appendage at the exterior of the hull, it can be seen that practically the entire hull is made available to receive the liquid bulk cargo.

In large ships a reduction in the frictional loss generated by the passage of the hull through the water which is ordinarily considered to be a function of the total wetted area, can be attained by reducing the length of the ship in favor of increasing the beam. This also provides increased transverse stability which makes feasible the location of the machinery above the freeboard deck.

In certain installations as shown in FIG. 15, ship 112 is provided with machinery section 113 disposed above freeboard deck 114. The machinery section contains a prime mover which drives a generator for energizing propulsion machinery unit 116 disposed within hull 115. Cables 116a transmit the power to the propulsion machinery unit. With this arrangement the propulsion machinery unit connected to propeller 117 occupies a portion of the cubic within the hull but the greater portion of cubic which the prime mover would otherwise occupy is made available to cargo.

While there has been shown what is considered to be the preferred embodiments of the invention, it is to be understood that various changes and modifications may be made therein without departing from the essential features of the invention.

Certain subject matter disclosed but not claimed in this application is substantially disclosed and claimed in co-pending continuation-in-part application Ser. No. 339,630 filed on January 23, 1964. This subject matter includes that of the bulk liquid carrier or tanker (see FIGURES 13 and 14). The present application and application Ser. No. 339,630 are owned by a common assignee.

What is claimed is:

1. A self-propelled ship with increased cargo capacity, said ship comprising (1) a hull having a freeboard deck, (2) a pair of bulkheads within said hull extending longitudinally for substantially the entire length of the hull and vertically for substantially the entire depth of the hull said bulkheads being fairly closely spaced in respect of the overall beam of the hull on either side of a vertical longitudinal centerline plane through the hull and defining an open space between them, (3) a plurality of decks within said hull extending longitudinally for substantially the entire length of the hull and defining a plurality of vertically arrayed cargo spaces outboard of the longitudinally extending bulkheads between these bulkheads and the hull, these cargo spaces being adapted to receive container cargo and the like and in the aggregate on either side of said pair of bulkheads occupying substantially the full depth of the hull as well as individually extending the considerably greater part of the length thereof, (4) a prime mover unit positioned at a level at least as high as that of the freeboard deck, said prime mover unit having means for providing a source of energy to propel the ship, (5) at least one propulsion unit extending from the exterior of said hull below the water line but not lower than the keel line thereof, said propulsion unit comprising (i) at least one propulsion motor adapted to be energized by said energy providing means and (ii) propulsion means actuated by said propulsion motor for propelling the ship, and (6) power transmitting means extending from said energy providing means to said propulsion unit.

2. A self-propelled ship with increased cargo capacity according to claim 1, said ship further comprising (7) a plurality of horizontally extending beams whereby at least the decks within said hull are supported, said beams overlying the surfaces of the decks with which they are associated and providing means for immediate support and movement of container cargo and the like.

3. A self-propelled ship with increased cargo capacity according to claim 1 which is adapted for endwise ramp loading of cargo onto and discharging of cargo from at least one of its decks.

4. A self-propelled ship with increased cargo capacity according to claim 1 which is characterized by aligned hatch openings through its freeboard deck and the decks within its hull whereby vertical handling of cargo between decks is facilitated.

5. A self-propelled ship with increased cargo capacity, said ship comprising (1) a hull having a freeboard deck, (2) a pair of bulkheads within said hull extending longitudinally for substantially the entire length of the hull and vertically for substantially the entire depth of the hull, said bulkheads being fairly closely spaced in respect of the overall beam of the hull on either side of a vertical longitudinal centerline plane through the hull and defining an open space between them, (3) a longitudinal shell-like structure extending along the outboard side of each bulkhead of said pair of bulkheads for substantially the entire length of the bulkhead but not extending as high as the upper edge nor as low as the lower edge of either bulkhead nor outwardly as far as said hull, said longitudinal shell-like structures being substantially symmetrical and defining within said hull on each side of said pair of bulkheads an inner cargo space adapted to receive dry bulk cargo and an outer cargo space adapted to receive liquid bulk cargo, these cargo spaces on either side of said pair of bulkheads occupying the considerably greater part of the length of the hull, (4) a prime mover unit positioned at a level at least as high as that of the freeboard deck, said prime mover unit having means for providing a source of energy to propel the ship, (5) at least one propulsion unit extending from the exterior of hull below the water line but not lower than the keel line thereof, said propulsion unit comprising (i) at least one propulsion motor adapted to be energized by said energy providing means and (ii) propulsion means actuated by said propulsion motor for propelling the ship, and (6) power transmitting means extending from said energy providing means to said propulsion unit.

6. A self-propelled ship with increased cargo capacity according to claim 5, said ship further comprising (7) a transverse bulkhead within said hull near the bow of said ship against which said shell-like structures terminate at their forward ends, and (8) a transverse bulkhead within said hull near the stearn of said ship against which said shell-like structures terminate their aft ends, said transverse bulkheads definding bow and stern spaces within said hull adapted primarily to receive liquid bulk cargo.

7. A self-propelled ship with increased cargo capacity, said ship comprising (1) a hull having a freeboard deck, (2) a pair of bulkheads within said hull extending longitudinally for substantially the entire length of the hull and vertically for substantially the entire depth of the hull, said bulkheads being fairly closely spaced in respect of the overall beam of the hull on either side of a vertical longitudinal centerline plane through the hull and defining an open space between them, and said bulkheads further defining cargo spaces adapted to receive dry bulk cargo between their outboard surfaces and said hull, these cargo spaces on either side of said pair of bulkheads occupying the considerably greater part of the length of the hull, (3) means actuated by compressed air for handling said dry bulk cargo with respect to said hull, said handling means including (i) a plurality of air slide devices within and extending substantially the full lengths of said cargo spaces on either side of said pair of bulkheads and (ii) means for pumping said bulk cargo by compressed air, said pumping means being adapted to receive said bulk cargo from said air slide devices when unloading said bulk cargo, and being located in the open space between the bulkheads of said pair of bulkheads, (4) a prime mover unit positioned at a level at least as high as that of the freeboard deck, said prime mover unit having means for providing a source of energy to propel the ship, (5) at least one propulsion unit extending from the exterior of said hull below the water line but not lower than the keel line thereof, said propulsion unit comprising (i) at least one propulsion motor adapted to be energized by said energy providing means and (ii) propulsion means actuated by said propulsion motor for propelling the ship, and (6) power transmitting means extending from said energy providing means to said propulsion unit.

8. A self-propelled ship with increased cargo capacity according to claim 7 in which said prime mover unit includes a gas turbine engine for providing a source of energy to propel the ship, said gas turbine engine having a combustion gas turbine and a compressor for delivering compressed air to said turbine, and said ship further comprising (7) means for delivering compressed air from said compressor to said dry bulk cargo handling means.

References Cited in the file of this patent

UNITED STATES PATENTS

| | | |
|---|---|---|
| 616,780 | Fraser | Dec. 27, 1898 |
| 1,010,376 | Keissler | Nov. 28, 1911 |
| 1,405,684 | Hamacek | Feb. 7, 1922 |
| 1,500,966 | Supinger | July 8, 1924 |
| 1,753,399 | Blair | Apr. 3, 1930 |
| 2,058,361 | Sherwood | Oct. 20, 1936 |
| 2,379,231 | Harrison | June 26, 1945 |
| 2,395,678 | Maynes | Feb. 26, 1946 |
| 2,430,380 | Welsh | Nov. 4, 1947 |
| 2,460,339 | Diamantides | Feb. 1, 1949 |
| 2,564,966 | Farrell | Aug. 21, 1951 |
| 2,696,570 | Costa | Oct. 26, 1954 |
| 3,038,432 | Goldman | June 12, 1962 |

FOREIGN PATENTS

| | | |
|---|---|---|
| 16,169 | Great Britain | of 1898 |
| 109,089 | Great Britain | Aug. 29, 1917 |
| 188,009 | Great Britain | Nov. 9, 1922 |
| 304,792 | Great Britain | Apr. 25, 1930 |
| 641,667 | Great Britain | Aug. 16, 1950 |
| 519,743 | France | Jan. 31, 1921 |
| 906,518 | France | May 22, 1945 |
| 1,166,958 | France | June 30, 1958 |
| 1,177,398 | France | Dec. 1, 1958 |

UNITED STATES PATENT OFFICE
CERTIFICATE OF CORRECTION

Patent No. 3,162,168                      December 22, 1964

Nathaniel James Ferris et al.

It is hereby certified that error appears in the above numbered patent requiring correction and that the said Letters Patent should read as corrected below.

Column 7, line 47, for "across" read -- cross --; column 10, line 41, for "puping" read -- pumping --; column 12, line 14, after "of" insert -- said --; line 28, after "terminate" insert -- at --; same column 12, line 29, for "definding" read -- defining --; column 13, line 10, for "Apr. 3, 1930" read -- Apr. 8, 1930 --; column 14, line 3, for "2,696,570" read -- 2,692,570 --.

Signed and sealed this 20th day of April 1965.

(SEAL)
Attest:

ERNEST W. SWIDER                      EDWARD J. BRENNER
Attesting Officer                        Commissioner of Patents